Aug. 14, 1956 H. M. FLEMING, JR 2,759,171

KEYBOARD INPUT CIRCUIT

Filed Nov. 9, 1951

INVENTOR
HOWARD M. FLEMING, JR.
BY William F. Glover
AGENT

United States Patent Office 2,759,171

Patented Aug. 14, 1956

2,759,171

KEYBOARD INPUT CIRCUIT

Howard M. Fleming, Jr., Orange, N. J., assignor to Monroe Calculating Machine Company, Orange, N. J., a corporation of Delaware Application November 9, 1951, Serial No. 255,643

1 Claim. (Cl. 340—174)

Figure 1:
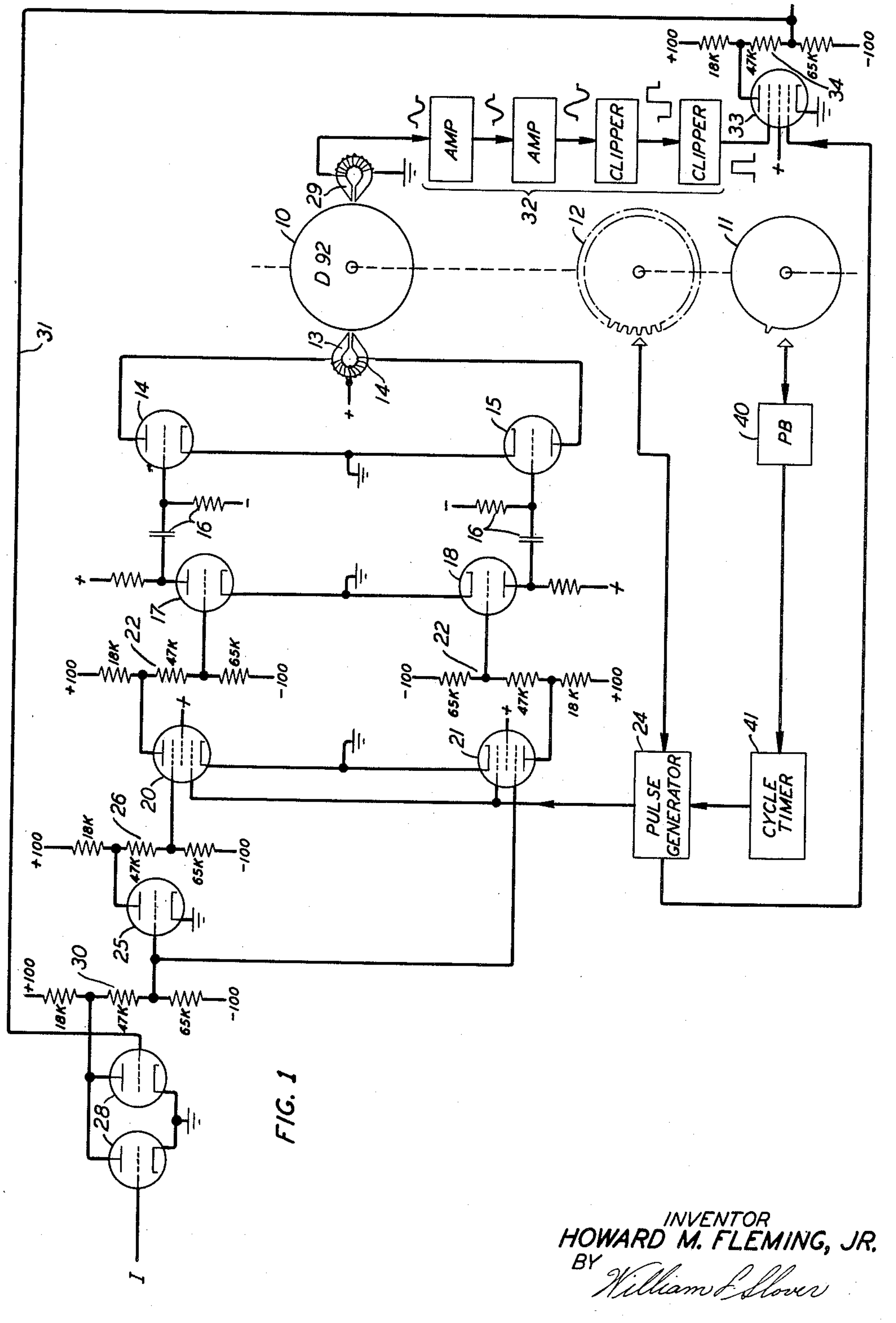

This invention relates to magnetic recording and more particularly to an improved means for recording serial information in the form of magnetized spots on a magnetic storage track.

Magnetic recording arrangements are known wherein each item of information to be recorded consists of a decimal digit in the coded decimal (1, 2, 4, 8) system of notation. In these arrangements the four binary digits (1, 2, 4, 8) which are combined differentially to represent decimal digits, are recorded each in the form of a magnetized spot in a magnetic storage track. In some arrangements a magnetized spot indicates a binary one and the absence of a spot, binary zero; and in other arrangements spots of opposite polarities are utilized to represent zero and one. The magnetic track may be on tape or may be on the periphery of a disc or may, along with the plurality of others, be on the periphery of a drum.

Magnetic storage systems of the type here involved are frequently used in electronic computers wherein it becomes necessary to record each information item at a specific time of cycle and also to read out or play back each such item at a particular time. Further, the information items may be transmitted to the recording medium at random intervals, either singularly or in groups. Also, it sometimes is necessary to read out only one information item during each cycle or each *n*th cycle. For example, information transmitted to the recording means from a ten-key keyboard would arrive at random intervals, one item at a time; and in the performance of multiplication it is necessary to extract from the storage medium one information item or digit per computer cycle, etc.

The known means for accomplishing this mode of operation include, in one instance, recording and reading devices associated with a pair of tracks on a magnetic drum and so controlled as to shift an information item initially recorded on one track, to the other track and then back again to the first track, this last shift occurring immediately following the initial recording of the next following information item. For convenience, this phase shift of information between successive item recordings has been termed "precession." In other known arrangements a magnetic disc or a single track of a drum is utilized and has the playback means therefor coupled back to the recording means, said coupling including gates which connect an electronic delay into the loop or not as required on each cycle. In this arrangement, the act of initially recording an information item effects the transmission of a previously recorded item through said delay, whereby the latter said item is re-recorded immediately following the new item.

The principal object of the invention is the provision of a precession arrangement for a magnetic storage system which is simpler than known arrangements and which is extremely efficient in operation.

According to the invention a magnetic disc, or a track of a magnetic drum, has the playback means associated therewith coupled back to the recording means the same as described above. However, the said recording and playback means are positioned relative to one another angularly of the recording track, a distance which provides a time delay between successive recordings of information items that is greater or less than a submultiple of a full cycle of said track by a factor equal to a submultiple of an item recording time. Means synchronized with and controlled by the rotation of the recorded track are also provided to maintain the recording means enabled only during specific predetermined cycles. Thus, precession occurs only when the recording means is enabled, each spot recording remaining in its recorded position during other cycles of the track.

Other objects and features of the invention will become apparent from the following description when read in the light of the drawing of which Fig. 1 is a schematic wiring diagram illustrating in detail the means of the invention.

Referring to the drawing, reference numeral 10 indicates a magnetic recording track which may be a magnetic disc such as that disclosed in the co-pending application of William Burkhart, No. 228,148, or a track of a magnetic drum such as that disclosed in the patent to A. Cohen et al., No. 2,540,654. As disclosed in the cited references the periphery of the recording member is provided with a magnetic coating adapted to spot magnetization. Associated with recording track 10 is a pair of other recording tracks 11 and 12 which, if a drum is utilized, are merely other tracks of the latter, and which, if discs are utilized, are rotated synchronously with disc 10. Tracks 11 and 12 are timing tracks and will be referred to in more detail hereinafter.

The means for impressing spot magnetizations on recording track 10, i. e., the recording means, includes a recording head 13 having a coil 14 which is connected to a source of high positive potential at its center and to the anodes of a pair of triodes 14 and 15 at either end. Obviously, alternate conductive states of the triodes will effect the magnetization of spots of opposite polarities by reversing the direction of current flow in coil 14. The cathodes of triodes 14 and 15 are grounded and their grids are connected through differentiator circuits 16 to the anodes of a pair of amplifiers 17 and 18. The resistors of the differentiator circuits are connected to a suitable source of negative potential which normally biases the triodes 14 and 15 to cut off. Application of a negative signal to either amplifier 17 or 18 will effect the application of a sharp positively directed pulse to the grid of the associated triode 14 or 15 and the latter will become conducting with the results described above. The grids of the amplifiers 17 and 18 are under control of coincidence gates 20 and 21 which, in the present instance, take the form of pentodes of the type 5915. The anode of each coincidence gate is connected to the juncture of the two positivemost sections of a three-section voltage divider 22 which may be connected across a source of + and −100 volt potentials. The center tap of the voltage divider is connected to the grid of the associated amplifier 17 or 18. By using the resistor values indicated in the drawing, potentials of zero volts are applied to the grids of said amplifiers when neither coincidence gate is conducting. However, if a gate does conduct, a potential of −20 volts is applied to the grid of the associated amplifier and cuts the latter off. The cathodes of the pentode gates are grounded and the screen grids are connected to sources of positive potentials in a normal manner. The control grids of both pentodes are connected by an obvious circuit to the output of a pulse generator 24 which will be described further hereinafter. The suppressor grids of the two pentodes are connected to a common source of signals, one directly, and the other through an inverter which, in the present instance, consists of a triode 25 having a voltage divider 26 identical with the voltage divider 22 discussed above. Thus, each signal from the said common source will have opposite effects on the gates 20 and 21. As shown here, inverter 25 is utilized in connection with gate 20.

The source of signals for gates 20 and 21 consists of an "or gate" which may comprise a pair of triodes 28 having their cathodes grounded and their anodes commonly connected to a voltage divider 30 of the sort described above. The connections from the voltage divider to inverter 25 and to gate 21 are obvious. The grids of the two tubes 28 are connected to separate signal sources; one being connected to any source of information I and the other being connected back to the output circuit of the playback unit for track 10, by a line 31. Obviously, if the signals on line 31 and from source "I" have a low potential to indicate binary zero and a high potential to indicate binary one, then the output of voltage divider 30 is the reverse, that is, low to indicate binary one and high to indicate zero.

Assuming that the low and high outputs of voltage divider 30 are of the appropriate values to cut off and to permit conduction of the inverter 25 and the gate 21, and also that the auxiliary inputs to said gate and to gate 20 permit conduction, then the application to the "or gate" of a signal indicative of binary one effects conduction of gate 20 and cuts off gate 21. This, in turn, effects cutoff of amplifier 17 and conduction of amplifier 18, and a binary one is recorded on track 10. In similar manner application of a low potential to gate 28 effects recording of a binary zero.

The playback means associated with track 10 may be of any suitable sort. As here shown it is of the sort disclosed in the co-pending application of Howard M. Fleming, Jr., Ser. No. 198,391 filed November 20, 1950, and includes a playback head 29 whose coil drives a series of amplifiers and pulse shapers generally designated as 32. The output of unit 32 which, it will be noted is a rectangular wave, is applied to the suppressor grid of a pentode coincidence gate 33 whose anode is connected to a three-section voltage divider 34 from which the return line 31 to "or gate" 28 is extended. The control grid of gate 33 is connected to the pulse generator 24 mentioned above.

The function of pulse generator 24 is to time the recording of each spot upon track 10 exactly, and also to time the output of gate 33 exactly. In this manner it is possible to play back, at a desired time, a signal which was recorded at some previous time, without fear of obtaining an erroneous signal. Preferably, pulses emitted from generator 24 are of extremely short duration with respect to their frequency. Referring to the wave forms indicated in the playback portion of the circuit, which, incidentally, indicate the playback of a binary zero, it will be seen that a single positive pulse indicative of the played back zero is applied to gate 33. The time at which this pulse is applied to said gate is fixed by the position of the playback head and a pulse from generator 24 must occur during its length if the proper signal is to be transmitted over line 31. If the two pulses are not synchronized, gate 33 would not conduct and a binary one would be indicated.

In order to time the action of pulse generator 24 exactly with reference to the rotation of track 10, track 12 has recorded therein a full complement of signals, that is, one for each recording position. The recordings on track 12 drive pulse generator 24, which actually may comprise a playback circuit and means for forming sharp pulses. Obviously, therefore, the output of pulse generator 24 is exactly synchronized with the rotation of the track 10 and the recording and playback means for the latter are operated at precisely the right times.

In order to obtain precession in accordance with the invention, the record and playback heads 13 and 29 associated with track 10 are located relative to one another angularly of said track, a distance which provides a delay between the recording and the playback of information items over line 31 which is greater or less than a submultiple of a cycle of the track by a submultiple of one item recording time. In the present instance, the coded decimal system of notation is utilized and one item recording time consists of four spot recording times, a spot being utilized to indicate the binary state of each of the four elements (1, 2, 4, 8) of the code. Also, track 10, as utilized in the present instance, embodies 180 spot recording positions. Therefore, the playback head 29 is positioned relative to the record head to obtain an effective delay of ninety-two spot recording times between recording of an item of information and playing back of the same over line 31. Obviously, an item recorded during a particular four spot recording period of track 10 is played back and re-recorded 92 spot recording times later and then again another 92 spot recording times later, which, due to the 180 spot position capacity of the track, is the four spot recording period immediately following that first mentioned.

It will be seen, therefore, that precession is accomplished without the use of external delaying means.

In order that information recorded on track 10 is precessed the appropriate amount, i. e., if information is being transmitted from a ten-key keyboard, recorded information must be precessed one item between successive key operations, and if, say, an entire multiplier is recorded on track 10 the same must be precessed one item or digit for each cycle or for each period between the times at which a multiplier digit is to be supplied to some calculating means—the following means are provided.

Track 11 is provided with a single magnetized spot which may indicate the beginning of each cycle of track 10. A playback circuit 40 associated with track 11 drives a cycle timer 41 which may include any electronic counter of suitable capacity and a selector matrix of crystal rectifiers or the like which permits output pulses from appropriate stages of the counter. The output of cycle timer 41 is applied to pulse generator 24 to prevent output pulses from the latter from enabling gates 20 and 21. This may be done in any manner, as, for example, by applying the output line from pulse generator 24 to a coincidence gate having also the output of cycle timer 41 applied thereto, and by connecting the output of the coincidence gate to an inverter which, in turn, is applied to gates 20 and 21.

The selector circuit included in cycle timer 41 is dependent for its constructional details on the requirements of the user, that is, it is constructed to permit high outputs from cycle timer 41 only on those cycles of track 10 during which precession is desired. For example, the counter included in the cycle timer may be regulated to reset itself after a predetermined count has been reached, this predetermined count representing the number of cycles of track 10 utilized in a particular operation. In programming this operation the cycles on which precession are required are recorded and the selector matrix formed accordingly. Obviously, the selector matrix may be controlled in one way for keyboard operation and in another way for multiplication operations, etc. The important point is that cycle timer 41 provides a desired output only on those cycles of track 10 during which precession is desired and in so doing, enables gates 20 and 21 only during those cycles.

I claim:

A precession arrangement for a magnetic storage system comprising a cyclically operated magnetic spot storage track, recording means enabled to impress spot magnetizations on said track during predetermined cycles on which precession is to be accomplished, a timing device including an electronic counter which is advanced one count for each cycle of the track a rectifier matrix controlled by said counter to produce timing signals when the latter attains counts appropriate to said predetermined cycles, said recording means including coincidence gate means to which signals to be recorded and said timing signals are applied, and playback means for sensing said spots, said playback means being connected back to the recording means to effect operation of the latter during said predetermined cycles and being located along the track from the latter a distance predetermined to effect a time delay between successive operations of the recording means that differs from a submultiple of a track cycle by one or more spot recording times.

References Cited in the file of this patent

UNITED STATES PATENTS

| | | |
|---|---|---|
| 2,279,018 | Wolfe | Apr. 7, 1942 |
| 2,540,654 | Cohen | Feb. 6, 1951 |
| 2,587,532 | Schmidt | Feb. 26, 1952 |
| 2,701,095 | Stibitz | Feb. 1, 1955 |

OTHER REFERENCES

Investigations for Design of Digital Calculating Machinery Progress Report No. 2, covering period of Aug. 10, 1948, to Nov. 10, 1948. The Computation Laboratory, Harvard University, Cambridge, Mass. (pages relied on, II–5 to II–9).

Mathematical Tables and Other Aids to Computation, pub. by National Res. Council, Washington, D. C., pp. 31 through 39, January 1950.

Proc. of the IRE, "A Digital Computer for Scientific Applications," by West et al., pp. 1452 through 1459, December 1948.

Electronic Engineering, "A Magnetic Digital Storage System," by Booth, pp. 234 through 2381, July 1949.

Proc. of the Inst. of Elec. Engrs., vol. 98, No. 61, The Position Synchronization of a Rotating Drum, by Williams et al., pp. 13 through 34, February 1951.